(12) United States Patent
Meredith et al.

(10) Patent No.: US 10,832,285 B2
(45) Date of Patent: Nov. 10, 2020

(54) MOBILE COUPON DISCOUNTS AND VALUATION BASED ON PROBABILITY OF A GEOFENCE COLLISION

(71) Applicants: AT&T Intellectual Property I, L.P., Atlanta, GA (US); AT&T Mobility II LLC, Atlanta, GA (US)

(72) Inventors: Sheldon Kent Meredith, Marietta, GA (US); Jeremy Fix, Acworth, GA (US); David Patterson, Los Altos, CA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 1289 days.

(21) Appl. No.: 14/260,576

(22) Filed: Apr. 24, 2014

(65) Prior Publication Data

US 2015/0310490 A1 Oct. 29, 2015

(51) Int. Cl.
*G06Q 30/02* (2012.01)
*H04W 4/021* (2018.01)

(52) U.S. Cl.
CPC ..... *G06Q 30/0261* (2013.01); *G06Q 30/0267* (2013.01); *G06Q 30/0269* (2013.01); *H04W 4/021* (2013.01)

(58) Field of Classification Search
USPC .................................................. 705/14, 319
See application file for complete search history.

(56) References Cited

U.S. PATENT DOCUMENTS 7,308,275 B2   12/2007  Cole et al.
8,135,624 B1    3/2012  Ramalingam et al.
(Continued)

FOREIGN PATENT DOCUMENTS

EP   2086271 A2     8/2009
WO   2013117738 A1  8/2013
WO   2013126894 A1  8/2013

OTHER PUBLICATIONS

Aleksander Buczkowski. "Location-Based Marketing: The academic framework." Dissertation Submitted for the Degree for Master of Science in Geospatial Technologies, Universidade Nova de Lisboa, Feb. 2012, 77 pages.

Cole et al. "Mobile Devices Meet Customer Loyalty First of a Kind (FOAK) Project Summary." IBM Research Report. Nov. 15, 2011. 18 pages.

(Continued)

*Primary Examiner* — Matthew T Sittner
*Assistant Examiner* — Richard G Reinhardt
(74) *Attorney, Agent, or Firm* — Amin, Turocy & Watson, LLP (57) ABSTRACT

To provide mobile device coupons and discounts, a mobile device couponing system is provided to generate and send coupons to mobile devices based on a probability that the mobile device is within a defined region. The value of the coupons can be inversely proportional to the probability that the mobile device is within the defined region. The probabilities can be precomputed by calculating the probability that each cell in grid in or around the defined region is in the defined region using a set of standardized location resolutions. When location information is received from the mobile device, the probability that the mobile device is within the defined region can be retrieved based on the closest cell that matches the location indicated in the location information and the standardized location resolution closest to the location resolution indicated by the mobile device.

20 Claims, 8 Drawing Sheets

(56) References Cited

U.S. PATENT DOCUMENTS

| | | | |
|---|---|---|---|
| 8,239,286 B2 | 8/2012 | Davis et al. | |
| 8,467,807 B1 | 6/2013 | Dalit et al. | |
| 8,484,076 B2 | 7/2013 | Roberts et al. | |
| 8,606,629 B2 | 12/2013 | Bous et al. | |
| 9,351,116 B2* | 5/2016 | Xu | H04W 4/023 |
| 2002/0065713 A1 | 5/2002 | Awada et al. | |
| 2003/0004802 A1 | 1/2003 | Callegari | |
| 2007/0281692 A1 | 12/2007 | Bucher et al. | |
| 2008/0262928 A1 | 10/2008 | Michaelis | |
| 2010/0331016 A1 | 12/2010 | Dutton et al. | |
| 2011/0161142 A1* | 6/2011 | Dunn | G06Q 30/02 |
| | | | 705/14.1 |
| 2011/0313840 A1 | 12/2011 | Mason et al. | |
| 2012/0323664 A1 | 12/2012 | Klems | |
| 2013/0013389 A1 | 1/2013 | Vitti et al. | |
| 2013/0095852 A1* | 4/2013 | MacDonald | H04W 4/026 |
| | | | 455/456.1 |
| 2013/0205324 A1* | 8/2013 | Sinha | G06T 1/0021 |
| | | | 725/23 |
| 2013/0217333 A1 | 8/2013 | Sprigg et al. | |
| 2013/0231137 A1 | 9/2013 | Hugie et al. | |
| 2013/0275198 A1 | 10/2013 | Zeta et al. | |
| 2014/0337123 A1* | 11/2014 | Nuernberg | H04W 4/021 |
| | | | 705/14.45 |
| 2015/0264523 A1* | 9/2015 | Xu | H04W 4/021 |
| | | | 455/456.3 |

OTHER PUBLICATIONS

Grewal et al. "Innovations in Retail Pricing and Promotions." Journal of Retailing 87S (1, 2011), Apr. 25, 2011, S43-S52.

Bareth et al. "geoXmart—A Marketplace for Geofence-Based Mobile Services." 2010 IEEE 34th Annual Computer Software and Applications Conference (COMPSAC), Jul. 19-23, 2010, pp. 101-106.

Dong, "Locate probability calculation inside SCADA," Retrieved: Mar. 19, 2014, 4 pages.

* cited by examiner

MOBILE COUPON DISCOUNTS AND VALUATION BASED ON PROBABILITY OF A GEOFENCE COLLISION

TECHNICAL FIELD

The subject disclosure relates to mobile coupon discounts, and, more specifically, to offering mobile coupon discounts based on location information.

BACKGROUND

A coupon is a ticket or document that can be exchanged for financial discount or rebate when purchasing a product or service. Coupons can be used as part of a marketing program for retailers or other providers of services in order to attract new customers or maintain or increase market share. Coupons may be delivered directly to mobile devices from the issuer (e.g., retailer or manufacture) or delivered indirectly via a third party mobile marketing service, such as web sites that offer printable coupons or digital coupons on behalf of multiple manufacturers or retailers. Redemption rates of coupons can be affected based on the travel distance required for the user to redeem the coupon or discount offer.

DETAILED DESCRIPTION

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

To provide mobile device coupons and discounts, a mobile device couponing system is provided to generate and send coupons to mobile devices based on a probability that the mobile device is within a defined region. The defined region can comprise the area inside a boundary of a geofence as defined by a retailer or the coupon offeror. The value of the coupons can be inversely proportional to the probability that the mobile device is within the defined region. The probabilities can be precomputed by calculating the probability that each cell in grid in or around the defined region is in the defined region using a set of standardized location resolutions. When location information is received from the mobile device, the probability that the mobile device is within the defined region can be quickly retrieved based on the closest cell that matches the location indicated in the location information and the standardized location resolution closest to the location resolution indicated by the mobile device.

Traditionally, determinations of whether mobile devices have entered a defined region have been based on the location alone. Using that model, small movements by mobile devices into or out of geofence regions will result in binary decisions to offer or not offer coupons, services, and etc. Depending on the resolution, or error, of the location information however, this would occasionally result in a user sometimes being offered coupons and sometimes not being offered coupons, even without any movement by the user. By adjusting the value of the coupon being offered based on the probability that the mobile device is within the geofence, a more predictable and ordered reward and incentivization system is possible.

For these considerations as well as other considerations, in one or more embodiments, a system includes a processor and a memory to store executable instructions that when executed by the processor, facilitate performance of operations, including receiving information representing location information for a mobile device, wherein the location information comprises a location and an error estimate associated with the location. The operations also include determining a probability that the mobile device is within a defined region based on the location information. The operations can also include initiating sending a coupon to the mobile device, wherein a value of the coupon is based on the probability that the mobile device is within the defined region.

In another embodiment, a method includes determining, by a device comprising a processor, a set of probabilities that a cell location is within a geofence region based on a set of location resolutions, wherein the cell location is associated with a grid reference system. The method can also include receiving information representing location information for a mobile device, wherein the location information comprises a location of the mobile device and a location resolution of the mobile device, wherein the location of the mobile device is within the cell location. The method can also include determining a probability that the mobile device is within the geofence region based on the location resolution of the mobile device and generating a coupon offer for the mobile device based on the probability that the mobile device is within the geofence region.

In another embodiment, a computer readable storage device storing executable instructions, that in response to execution, cause a system comprising a processor to perform operations. The operations can include receiving information representing location information for a mobile device, wherein the location information comprises a location and a location resolution associated with the location. The operations can also include determining a probability that the mobile device is within a boundary area based on the location information. The operations can also include generating a coupon and sending the coupon to the mobile device, wherein a value of the coupon is based on the probability that the mobile device is within the boundary area.

Figure 1:
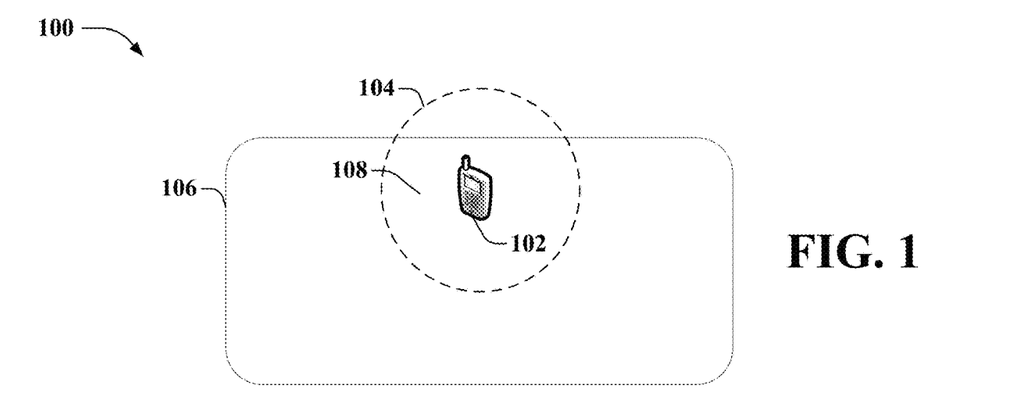
FIG. 1 is an example, non-limiting embodiment of a block diagram showing a mobile device that has a high probability of being in a geofence region in accordance with various aspects described herein.

Turning now to FIG. 1, illustrated is an example, non-limiting embodiment of a block diagram 100 showing a mobile device 102 that has a high probability of being in a geofence region. Although the location information that is associated with the mobile device 102 indicates that the mobile device 102 is within the region defined by the geofence boundary 106, it is not far enough within the region that the probability that the mobile device 102 is within the region is 100%. This is due to the location resolution, or the error estimates associated with the location information.

The location of the mobile device 102 can be ascertained in a variety of manners, including but not limited to network based location determination (cellular identification, multilateration, forward link trilateration, and etc.) or handset based location determination (radionavigation, GPS and etc.) as well as some combination or hybrid thereof. Each of the different location determination methods can have a degree of error built in to the location, that can range from several meters in the case of GPS to hundreds of meters or more. The location information that is received from the mobile device 102 or the network is then not just a single point location where the mobile device 102 is located, but rather the mobile device 102 can be located in a range of locations within the error boundary 104. The size of the error boundary 104 can therefore be based on the type of location determination performed to find the location of mobile device 102.

In FIG. 1, the mobile couponing system will generate and send a coupon to the mobile device since there is a small probability that the mobile device 102 is within the boundary 106. The value of the coupon however can be based on the probability that the mobile device 102 is within the area marked by geofence boundary 106. A simple way of determining the probability is by dividing the intersection area 108 where the geofence region and the area marked by error estimate 104 overlap by the area marked by error estimate 104. Other methods of determining the probability are also possible, and can be implemented in other embodiments.

Figure 2:
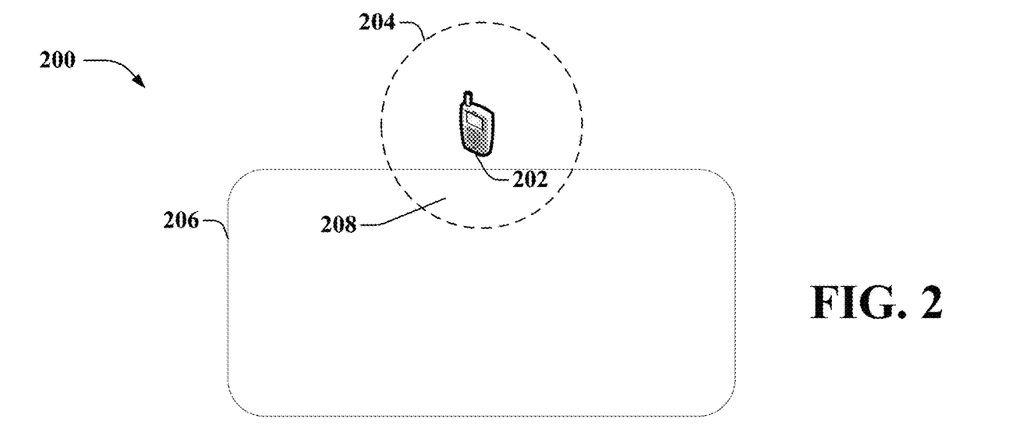
FIG. 2 is an example, non-limiting embodiment of a block diagram showing a mobile device that has a low probability of being in a geofence region in accordance with various aspects described herein.
Figure 3:
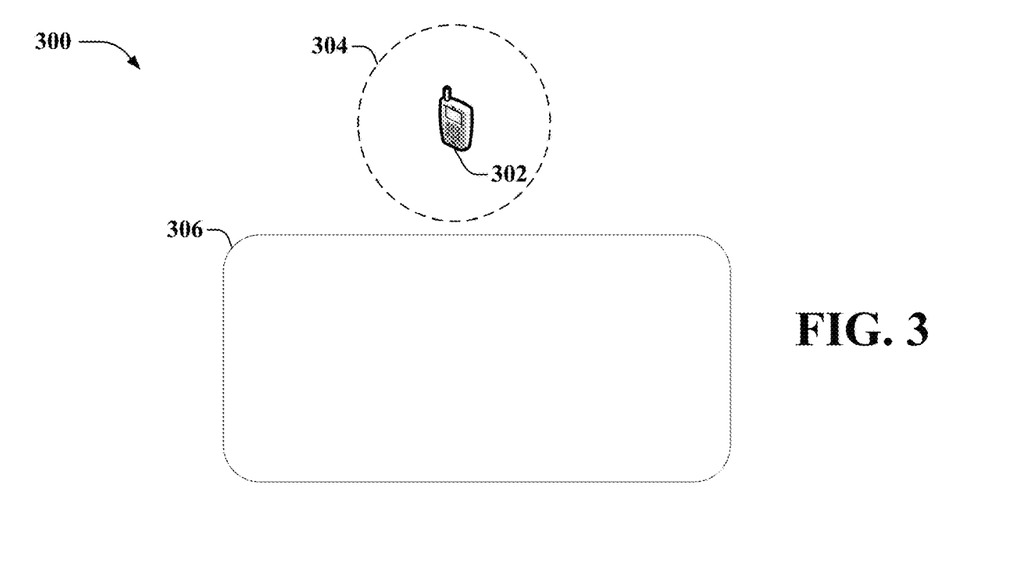
FIG. 3 is an example, non-limiting embodiment of a block diagram showing a mobile device that has a zero probability of being in a geofence region in accordance with various aspects described herein.

In FIG. 2, there is also a non-zero probability that the mobile device 202 is within the boundary 206, since the error zone 204 overlaps with the boundary 206. However, the probability is lower since the intersection area 208 is smaller, and therefore the coupon can be of a greater value than the coupon delivered to mobile device 102 in FIG. 1. In FIG. 3 however, since there is no intersection area between error zone 304 and boundary 306, the likelihood or probability that the mobile device 302 is within boundary 306 is effectively zero, and so no coupon is sent. Even if the mobile device 302 was a little closer to the boundary 306 and there was a non zero probability that the mobile device 302 was within the boundary 306, for probabilities below a predetermined level no coupon will be generated.

It is to be appreciated that in an embodiment, the error zones 304, 204, and 104 do not necessarily limit the likelihood of the mobile devices being found outside the error zones. Instead, the probability that the mobile devices have of being found in an area goes down as some function (exponential, logarithmic, etc) of the distance from the center of the area. Therefore, there can be a non-zero probability that the mobile devices 302, 202, and 102 can be found beyond the error zones 304, 204, and 104. The error zones 304, 204, and 104 can thus represent the lower limit probability threshold beyond which no coupon is offered. This observation also applies to the other error zones shown in FIGS. 4 to 7.

Figure 4:
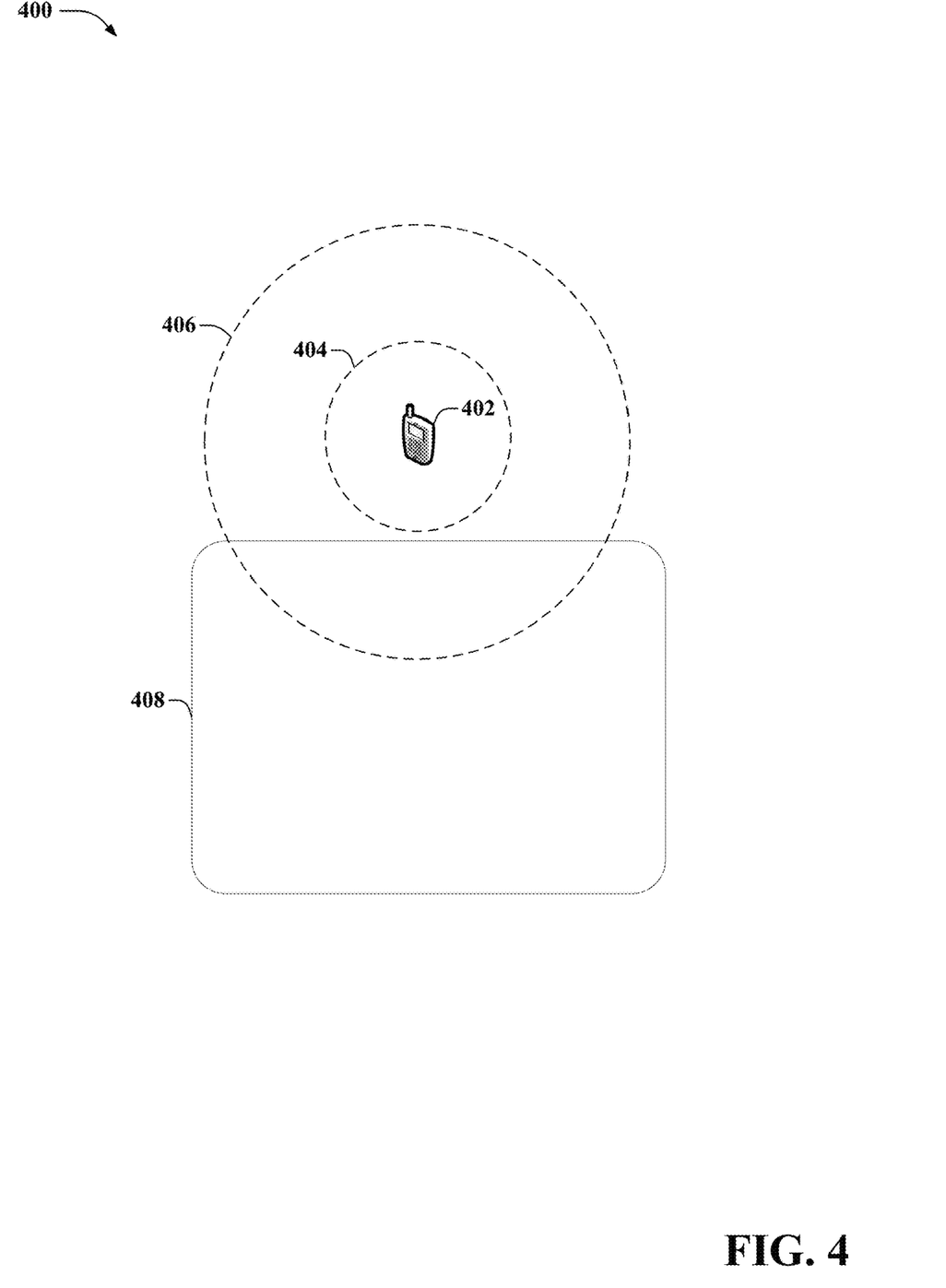
FIG. 4 is an example, non-limiting embodiment of a block diagram showing a mobile device with multiple location resolutions in accordance with various aspects described herein.

Turning now to FIG. 4, illustrated is an example, non-limiting embodiment of a block diagram 400 showing a mobile device 402 that can have multiple location resolutions in accordance with one or more embodiments. In some embodiments, when the location of the mobile device 402 is being determined by lower resolution/higher error network based location methods such as cell ID or cell tower multilateration, the error zone 406 can be used to show the area where mobile device 402 may be located. When higher location/lower error location methods such as GPS are used, the error zone 404 shows a smaller area in which mobile device 402 may be located.

When error zone 406 is in effect, there is a low likelihood that the mobile device might be within the geofence region 408. Depending on the probability cutoff threshold, mobile device 402 can then be sent a coupon. By contrast, if GPS is being used, and the smaller error zone 404 shows that the mobile device 402 has no almost no likelihood of being in geofence region 408, no coupon will be sent.

Figure 5:
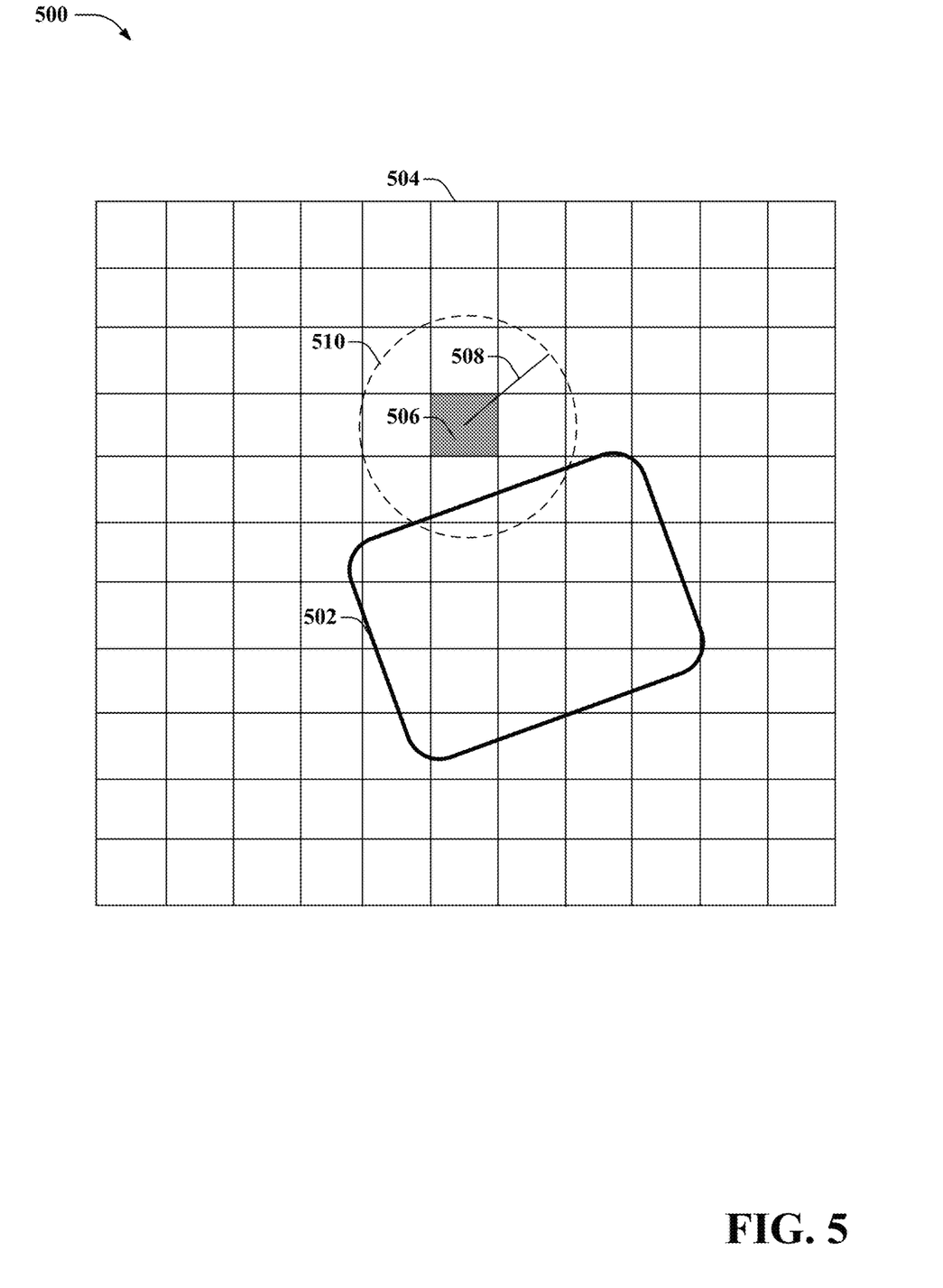
FIG. 5 is an example, non-limiting embodiment of a system that predetermines location probabilities with a grid reference system in accordance with various aspects described herein.

Turning now to FIG. 5 illustrated is an example, non-limiting embodiment of a system 500 that predetermines location probabilities with a grid reference system in accordance with various aspects described herein. Displayed in FIG. 5 is an embodiment of how the mobile device couponing system predetermines probabilities that mobile devices are within geofence regions using a grid reference system.

In some embodiments, grid reference system 504 can be a military grid reference system ("MGRS") or can be a Cartesian grid in other embodiments. The grid reference system 504 can comprise a number of cells of predetermined or defined size. The size of the cells can be adjusted depending on the desired accuracy or computational resources available. In an embodiment, the cell size can automatically be adjusted as the computational resources change.

A geofence region 502 can be saved with parameters that define the size and position of the geofence region 502 relative to the grid reference system 504. The mobile couponing system can then precompute the probability that a mobile device located in each of the cells of the grid reference system 504 has of being within the geofence region 502 based on the error estimates. It is to be appreciated that even though the mobile device location information received may indicate that the mobile device is located outside the geofence region (e.g., in cell 506) it may actually be within the geofence region 502 due to the inherent error 508 in the location information. Due to the error 508, the location of the mobile device can actually be anywhere within the error zone 504.

In an embodiment, since a part of the error zone 510 intersects with geofence region 502, there is a small probability that the mobile device location which is indicated as being in cell 506 may actually be within the geofence region 502. That probability is computed, and then saved for that cell and location resolution. The probability can also be computed for a range of standardized location resolutions, including but not limited to 10 m, 100 m, 300 m corresponding to the different location methods. The probabilities for the range of error estimates/location resolutions can also be precomputed for all cells nearby or within geofence region 502 where the probability results in a non-zero probability, or a probability above the predetermined cutoff.

It is to be appreciated that the geofence region 502 can be many different sizes and shapes. And in some embodiments, there may be more than one overlapping geofence regions. The system can precompute probabilities that each of the cells may be in each of the different geofence regions.

Figure 6:
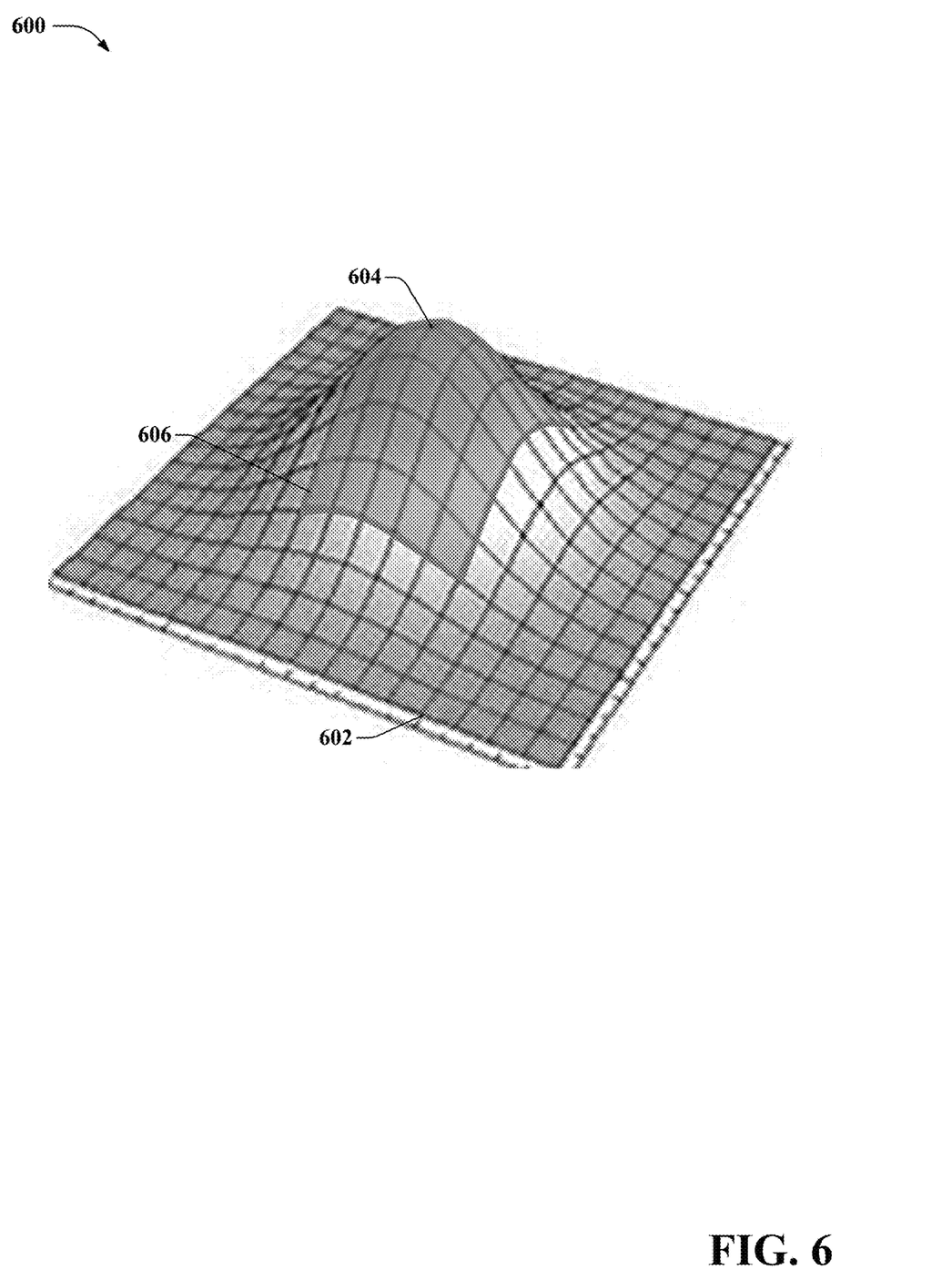
FIG. 6 is an example, non-limiting embodiment of a drawing depicting a technique for calculating a location probability in accordance with various aspects described herein.

Turning now to FIG. 6, illustrated is an example, non-limiting embodiment of a drawing depicting a technique for calculating a location probability in accordance with various aspects described herein. The grid reference system 602 shows a peak 604 where the contour represents the probability where the mobile device may be located, with the higher elevation representing an increased probability for finding the mobile device located there. A steeper contour would indicate a higher location resolution result. To calculate the probability that the mobile device is located within the geofence area 606, the volume underneath the geofence area 606 is determined and divided by the percentage of the total volume.

Figure 7:
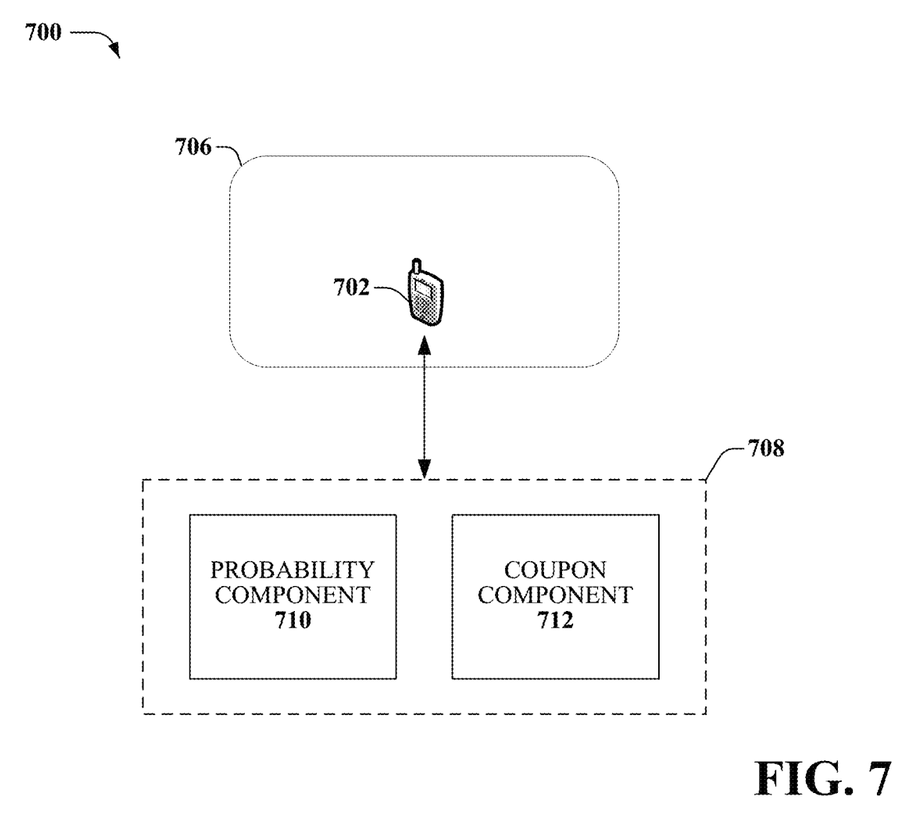
FIG. 7 is an example, non-limiting embodiment a mobile device couponing system in accordance with various aspects described herein.

Turning now to FIG. 7, illustrated is a block diagram 700 of an example, non-limiting embodiment of a mobile device couponing system 708 in accordance with various aspects described herein. The system 708 includes a probability component 710 that receives information representing location information for mobile device 702, wherein the location information comprises a location and an error estimate associated with the location. The probability component 710 also determines a probability that the mobile device 702 is within the geofence region 706 based on the location information. A coupon component 712 is provided to initiate sending of a coupon to the mobile device 702, wherein the value of the coupon is based on the probability that the mobile device 702 is within the geofence region 706.

In an embodiment the mobile device couponing system 708 can be part of the mobile network platform, and in other embodiments the mobile device couponing system 708 can be hosted elsewhere.

The mobile device couponing system can receive the location information from the mobile device 702 or from the mobile network associated with the device 702. The location information can include standardized elements of information that identify the mobile device (such as Mobile ID, IMSI, etc) as well as a timestamp, latitude and longitude, location source code, and error estimate source code. The location source code can include a code indicating the type of location determination method or whether it was performed by the network or the handset. An error estimate code can also be included that indicates the magnitude of the error associated with the latitude and longitude.

In an embodiment, the probability component 710 can precompute the probabilities that each of a set of locations is within the geofence region. The set of locations can correspond to the cells or bins of grid reference system 504 which in some embodiments can be MGRS bins. The probability component 710 can precompute the probabilities for each of a set of error estimates corresponding to standardized error estimates for different location methods.

In an embodiment, the probability component 710 can convert the latitude and longitude in the location information to the grid reference bin ID. The probability component 710 can then index the database storing the pre-computed probabilities and retrieve the probability that corresponds to the bin ID and the error estimate code. If there is not a precomputed probability for a particular error estimate, probability component 710 can select the probability corresponding to the closest or a similar error estimate.

Once a probability that the mobile device 702 is within geofence region 706, coupon component 712 can generate and initiate the sending of a coupon to the mobile device 702 or to a user account (e.g., email) associated with the mobile device 702. Coupon component 712 can set the value of the coupon based on the probability that the mobile device 702 is within the geofence region 706. Higher probabilities can have lower valued coupons while lower probabilities can have coupons with a higher value. A lower probability that the mobile device 702 is within the geofence region 706 indicates that the mobile device 702 is either further away from the geofence region 706 than a higher probability, or it can indicate that the mobile device couponing system 708 has a lower confidence in the location of the mobile device 702.

A low probability results in a more valuable coupon since the retailer or service provider may wish to entice a customer to come visit their establishment. A customer that is already within, or very nearby the establishment may not need as much incentive to come, and so the value of the coupon is lower when the probability is higher that the mobile device 702 is within the geofence region 706. In an embodiment, when the probability is below or above predetermined thresholds no coupons will be sent, as it may not be worth sending the coupon to somebody too far away, or to somebody already in the establishment.

Coupon component 712 can also send coupons to the mobile device 702 based on changing probabilities that the mobile device 702 is within the geofence region 706. The coupons can also be offered based on a function of the movement and probability. For a mobile device that is moving laterally with respect to the geofence region 706, if the probability remains similar, then increasing the value of the coupon will be beneficial. If the mobile device were moving towards or away from the geofence region 706. Then the coupon may not have as great an effect on changing the consumer's behavior.

Figure 8:
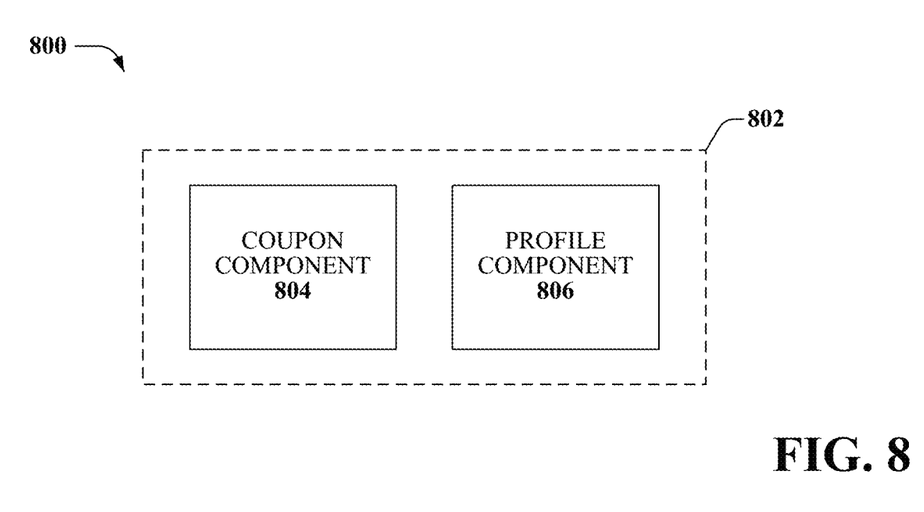
FIG. 8 is an example, non-limiting embodiment of a mobile device couponing system in accordance with various aspects described herein.

Turning to FIG. 8, illustrated is a block diagram 800 of an example, non-limiting embodiment of a mobile device couponing system 802 in accordance with various aspects described herein. The coupon component 804 can issue coupons where the value of the coupon is at least partially based on profile information associated with the mobile device. The profile component 806 can collect and/or retrieve the profile information and generate a multiplier or other factor that can be used by the coupon component 804 in adjusting the value of the coupon.

The profile component 806 can collect information related to demographic information, information about coupon conversion history and purchase history. The demographic information can include age of the person, race, ethnic background, socioeconomic status, home address, and other information. A customer who has a high rate of converting, or using coupons may be easier to entice than somebody else, and so a lower value coupon may be sufficient to change behavior. Alternatively, in other embodiments, a customer with a high conversion rate can be rewarded with higher value coupons. The probability thresholds for the high and low end cutoffs can also be adjusted based on the profile information. For instance, for a person with a low conversion rate, or with little history of past purchase the low end probability threshold can be increased, such that no coupon is sent to that person if they have a low probability of being in the geofence region, even if coupons are still sent to other mobile devices that have the same probability of being in the geofence region. Based on a profile report generated by the profile component 806, the coupon component 804 can adjust the values and other parameters associated with the coupons.

The effect of the profile component 806 on value and other coupon parameters can be determined by the retailer or service provider associated with the geofence. The settings can be standardized or customized based on the establishment's preferences. The types of coupons and discounts offered or provided by the coupon component 804 can also be based on the establishment's preferences. In some embodiments, the coupons are issued by a third party, or by the establishment themselves, but the coupon component 804 initiates the sending of the coupons without actually sending the coupons.

Figure 9:
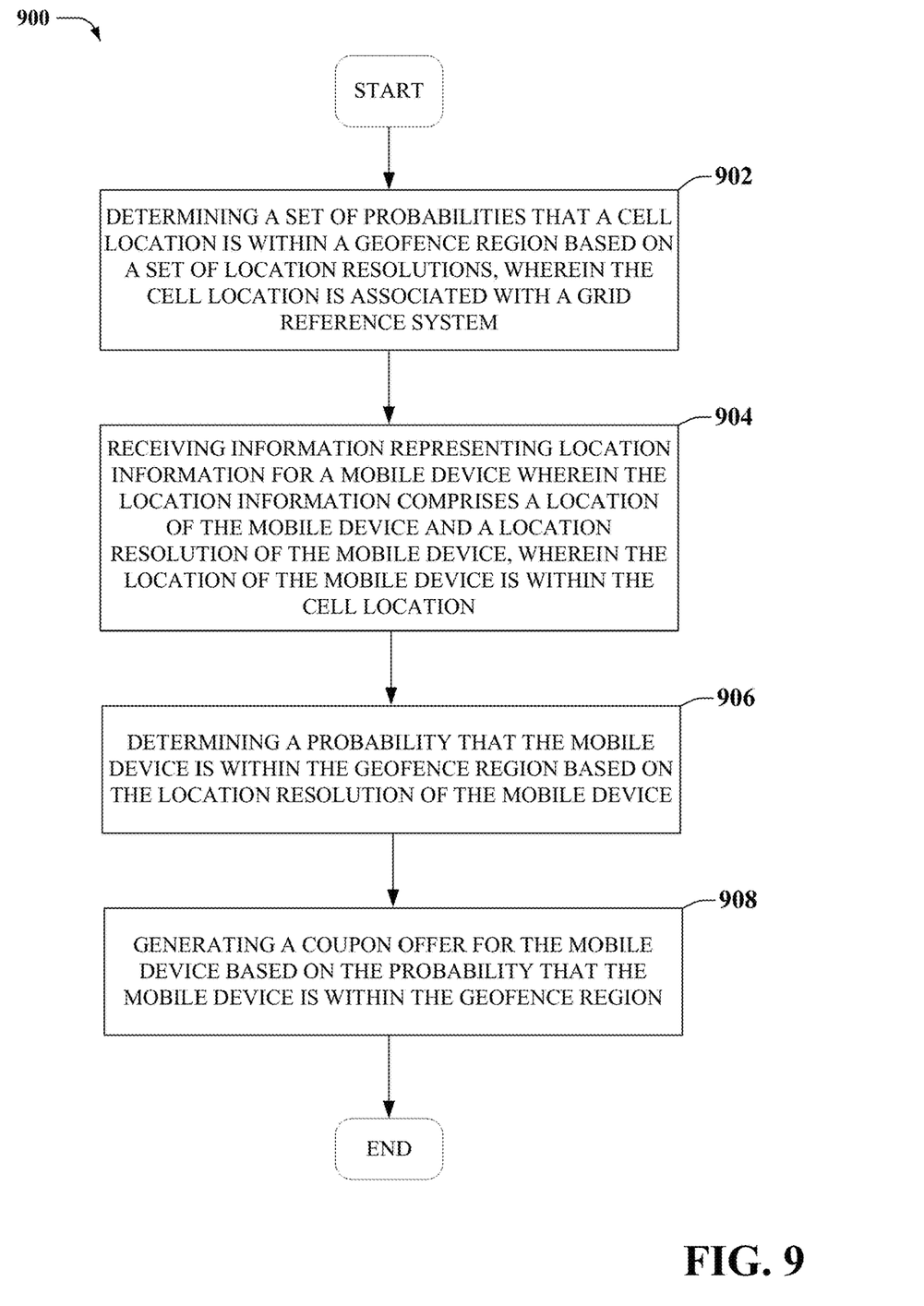
FIG. 9 illustrates a flow diagram of an example, non-limiting embodiment of a method for mobile device couponing as described herein.

FIG. 9 illustrates a process in connection with the aforementioned systems. The process in FIG. 9 can be implemented for example by systems 700 and 800 as illustrated in FIGS. 7-8 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 9 illustrates a flow diagram of an example, non-limiting embodiment of a method for mobile device couponing as described herein. Methodology 900 can begin at 902, where a set of probabilities that a cell location is within a geofence region based on a set of location resolutions can be determined, wherein the cell location is associated with a grid reference system. The probabilities can also be determined for a set of locations, where the set of locations correspond to the cells or bins of grid reference system 504 which in some embodiments can be MGRS bins. The probabilities can be precomputed for each of a set of error estimates corresponding to standardized error estimates for different location methods.

At 904, information can be received that represents location information for a mobile device, wherein the location information comprises a location of the mobile device and a location resolution of the mobile device, wherein the location of the mobile device is within the cell location. The location information can also include standardized elements of information that identify the mobile device (such as Mobile ID, IMSI, etc) as well as a timestamp, latitude and longitude, location source code, and error estimate source code. The location source code can include a code indicating the type of location determination method or whether it was performed by the network or the handset. An error estimate code can also be included that indicates the magnitude of the error associated with the latitude and longitude. In some embodiments, the location information is received directly from the handset or mobile device, whereas in other embodiments the location information is received from the mobile network.

At 906, a probability that the mobile device is within the geofence region is determined based on the location resolution of the mobile device. The database that stores the pre-computed probabilities can be indexed and the probability that corresponds to the bin ID and the error estimate code can be retrieved. If there is not a precomputed probability for a particular bin or error estimate, the probability that corresponds to the closest bin or error estimate can be selected.

At 908, a coupon offer for the mobile device can be generated based on the probability that the mobile device is within the geofence region. The value of the coupon generated can be inversely proportional to the probability that mobile device is within the geofence region.

Figure 10:
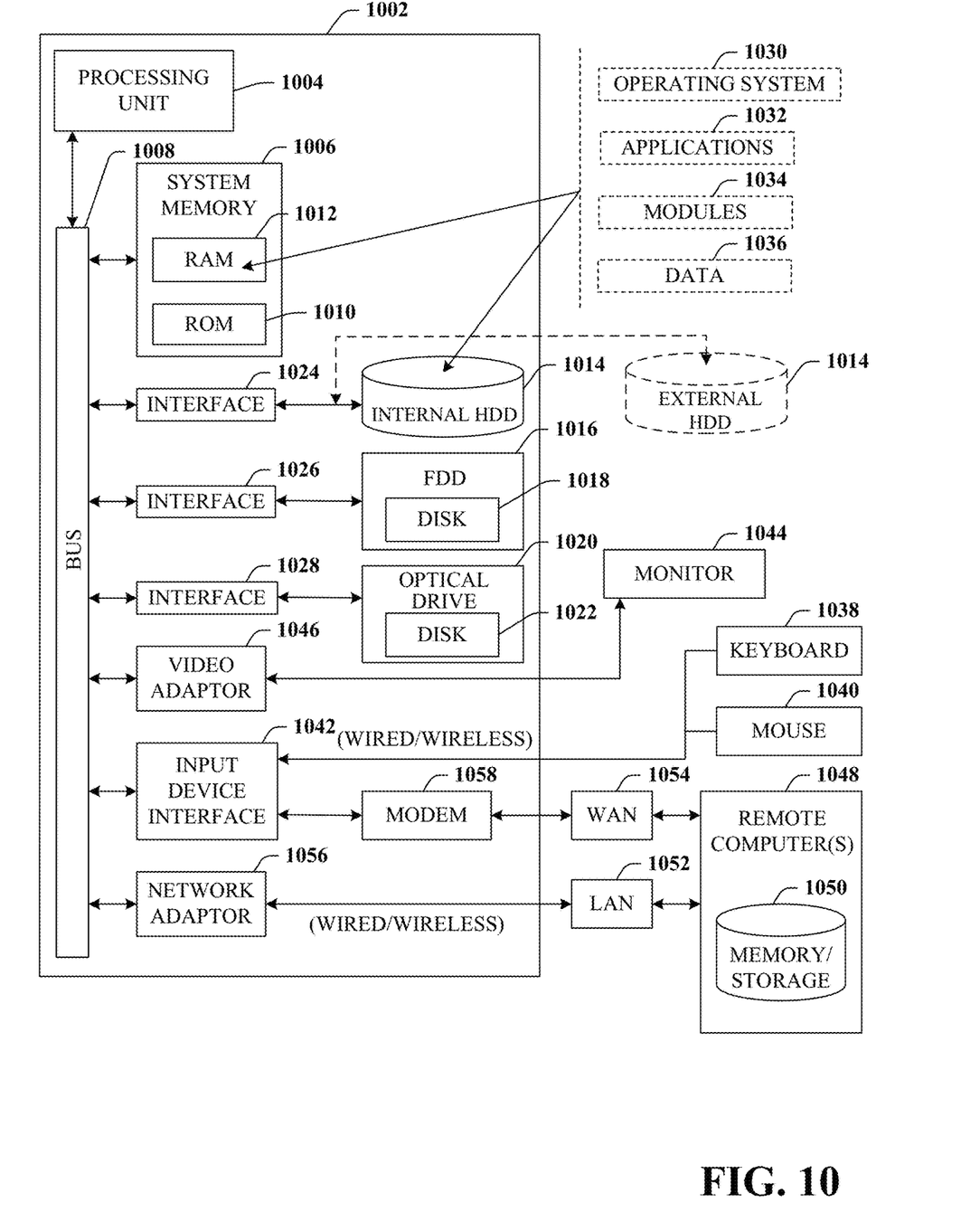
FIG. 10 is a block diagram of an example, non-limiting embodiment of a computing environment in accordance with various aspects described herein.

Referring now to FIG. 10, there is illustrated a block diagram of a computing environment in accordance with various aspects described herein. For example, in some embodiments, the computer can be or be included within the radio repeater system disclosed in any of the previous systems 200, 300, 400, 500, 600 and/or 700.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and Institute of Electrical and Electronics Engineers (IEEE) 1094 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an infrared (IR) remote control, a joystick, a game pad, a stylus pen, touch screen or the like. These and other input devices are often connected to the processing unit 1004 through an input device interface 1042 that can be coupled to the system bus 1008, but can be connected by other interfaces, such as a parallel port, an IEEE 1394 serial port, a game port, a universal serial bus (USB) port, an IR interface, etc.

A monitor 1044 or other type of display device can be also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1052 through a wired and/or wireless communication network interface or adapter 1056. The adapter 1056 can facilitate wired or wireless communication to the LAN 1052, which can also include a wireless AP disposed thereon for communicating with the wireless adapter 1056.

When used in a WAN networking environment, the computer 1002 can include a modem 1058 or can be connected to a communications server on the WAN 1054 or has other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are example and other means of establishing a communications link between the computers can be used.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10BaseT wired Ethernet networks used in many offices.

Figure 11:
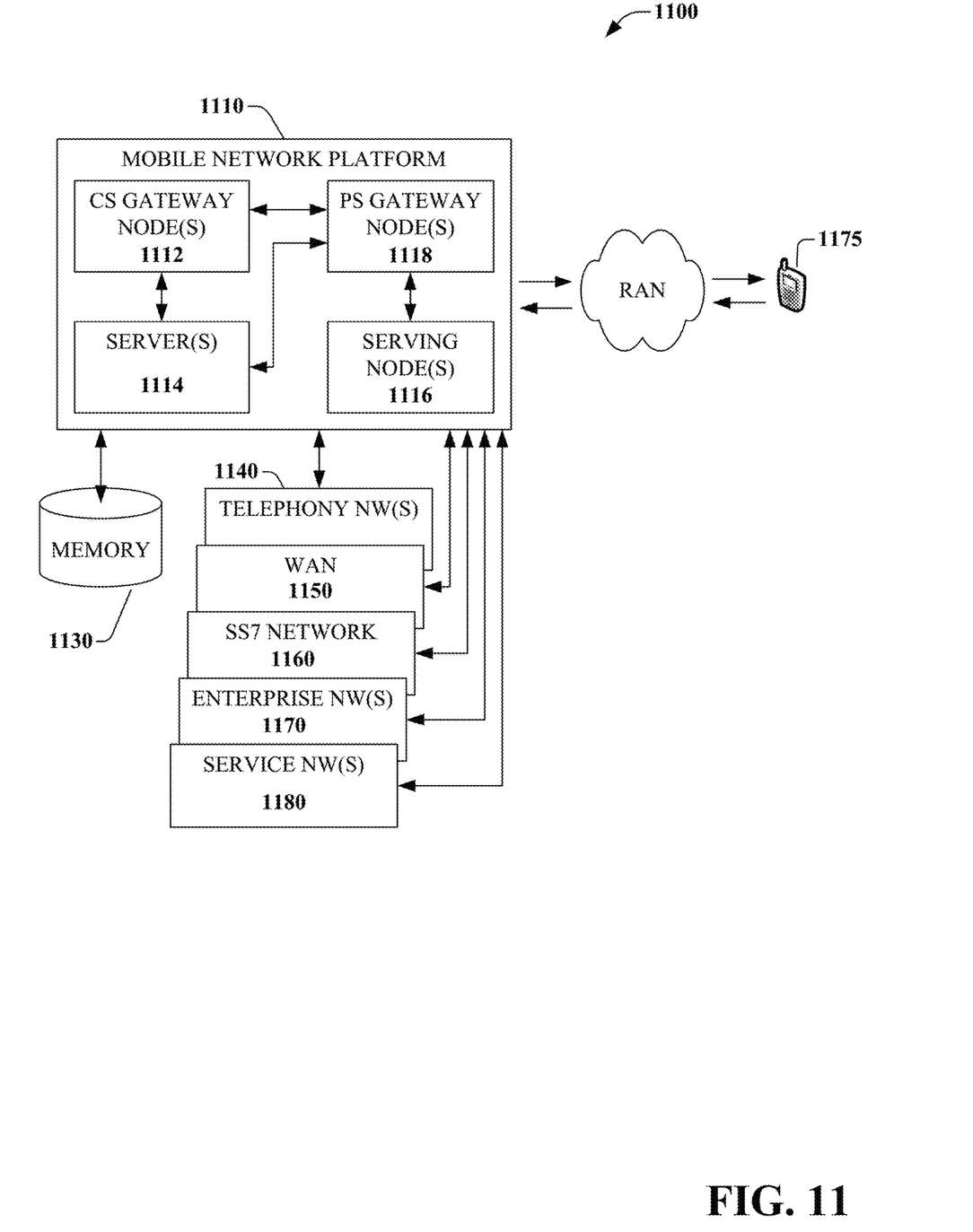
FIG. 11 is a block diagram of an example, non-limiting embodiment of a mobile network platform in accordance with various aspects described herein.

FIG. 11 presents an example embodiment 1100 of a mobile network platform 1110 that can implement and exploit one or more aspects of the disclosed subject matter described herein. Generally, wireless network platform 1110 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1110 can be included in telecommunications carrier networks, and can be considered carrier-side components as discussed elsewhere herein. Mobile network platform 1110 includes CS gateway node(s) 1112 which can interface CS traffic received from legacy networks like telephony network(s) 1140 (e.g., public switched telephone network (PSTN), or public land mobile network (PLMN)) or a signaling system #7 (SS7) network 1170. Circuit switched gateway node(s) 1112 can authorize and authenticate traffic (e.g., voice) arising from such networks. Additionally, CS gateway node(s) 1112 can access mobility, or roaming, data generated through SS7 network 1170; for instance, mobility data stored in a visited location register (VLR), which can reside in memory 1130. Moreover, CS gateway node(s) 1112 interfaces CS-based traffic and signaling and PS gateway node(s) 1118. As an example, in a 3GPP UMTS network, CS gateway node(s) 1112 can be realized at least in part in gateway GPRS support node(s) (GGSN). It should be appreciated that functionality and specific operation of CS gateway node(s) 1112, PS gateway node(s) 1118, and serving node(s) 1116, is provided and dictated by radio technology(ies) utilized by mobile network platform 1110 for telecommunication.

In addition to receiving and processing CS-switched traffic and signaling, PS gateway node(s) 1118 can authorize and authenticate PS-based data sessions with served mobile devices. Data sessions can include traffic, or content(s), exchanged with networks external to the wireless network platform 1110, like wide area network(s) (WANs) 1150, enterprise network(s) 1170, and service network(s) 1180, which can be embodied in local area network(s) (LANs), can also be interfaced with mobile network platform 1110 through PS gateway node(s) 1118. It is to be noted that WANs 1150 and enterprise network(s) 1160 can embody, at least in part, a service network(s) like IP multimedia sub-system (IMS). Based on radio technology layer(s) available in technology resource(s) 1117, packet-switched gateway node(s) 1118 can generate packet data protocol contexts when a data session is established; other data structures that facilitate routing of packetized data also can be generated. To that end, in an aspect, PS gateway node(s) 1118 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1100, wireless network platform 1110 also includes serving node(s) 1116 that, based upon available radio technology layer(s) within technology resource(s) 1117, convey the various packetized flows of data streams received through PS gateway node(s) 1118. It is to be noted that for technology resource(s) 1117 that rely primarily on CS communication, server node(s) can deliver traffic without reliance on PS gateway node(s) 1118; for example, server node(s) can embody at least in part a mobile switching center. As an example, in a 3GPP UMTS network, serving node(s) 1116 can be embodied in serving GPRS support node(s) (SGSN).

For radio technologies that exploit packetized communication, server(s) 1114 in wireless network platform 1110 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1110. Data streams (e.g., content(s) that are part of a voice call or data session) can be conveyed to PS gateway node(s) 1118 for authorization/authentication and initiation of a data session, and to serving node(s) 1116 for communication thereafter. In addition to application server, server(s) 1114 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1110 to ensure network's operation and data integrity in addition to authorization and authentication procedures that CS gateway node(s) 1112 and PS gateway node(s) 1118 can enact. Moreover, provisioning server(s) can provision services from external network(s) like networks operated by a disparate service provider; for instance, WAN 1150 or Global Positioning System (GPS) network(s) (not shown). Provisioning server(s) can also provision coverage through networks associated to wireless network platform 1110 (e.g., deployed and operated by the same service provider), such as femto-cell network(s) (not shown) that enhance wireless service coverage within indoor confined spaces and offload RAN resources in order to enhance subscriber service experience within a home or business environment by way of UE 1175.

It is to be noted that server(s) 1114 can include one or more processors configured to confer at least in part the functionality of macro network platform 1110. To that end, the one or more processor can execute code instructions stored in memory 1130, for example. It is should be appreciated that server(s) 1114 can include a content manager 1115, which operates in substantially the same manner as described hereinbefore.

In example embodiment 1100, memory 1130 can store information related to operation of wireless network platform 1110. Other operational information can include provisioning information of mobile devices served through wireless platform network 1110, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1130 can also store information from at least one of telephony network(s) 1140, WAN 1150, enterprise network(s) 1160, or SS7 network 1170. In an aspect, memory 1130 can be, for example, accessed as part of a data store component or as a remotely connected memory store.

In order to provide a context for the various aspects of the disclosed subject matter, FIG. 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory (see below), non-volatile memory (see below), disk storage (see below), and memory storage (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of the each cell site of the acquired network. A classifier is a function that maps an input attribute vector, $x=(x1, x2, x3, x4, \ldots, xn)$, to a confidence that the input belongs to a class, that is, $f(x)=$confidence (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
determining multiple groups of cells in a grid reference system associated with a mobile network that correspond to respective predetermined cells, wherein respective groups of cells of the multiple groups of cells represent possible locations due to respective error estimates associated with respective resolutions of respective location detection systems that identify the respective predetermined cells, wherein the respective groups of cells of the multiple groups of cells correspond to respective error estimates, wherein a size of a cell from the respective groups of cells is determined based on resource data indicative of information for computational resource availability associated with the processor, and wherein the size of the cell is adjusted in response to a change in the computational resource availability;
receiving information representing location information for a mobile device, wherein the location information comprises a cell location in the grid reference system that corresponds to a cell of the respective predetermined cells and an indication of a type of location detection system;
selecting a group of cells of the multiple groups of cells based on the type of location detection system;
determining a probability that the mobile device is within a defined region associated with the mobile network based on determining an overlap area of the group of cells and the defined region;
determining a base value of a coupon, wherein the base value of the coupon is based the probability that the mobile device is within the defined region;
determining a first coupon adjustment value, wherein the first coupon adjustment value is based on profile information comprising demographic information, information about conversation history, and purchase history;
determining a second coupon adjustment value, wherein the second coupon adjustment value is based on preference information associated with the profile information, received from a retailer or service provider associated with the defined region;
determining a third coupon adjustment value, wherein the third coupon adjustment value is based on a direction of movement of the mobile device;
determining a fourth coupon adjustment value, wherein the fourth coupon adjustment value is based on a conversion rate of a user associated with the mobile device;
determining a final coupon value based on a combination of the base value of the coupon, the first coupon adjustment value, the second coupon adjustment value, the third coupon adjustment value, and the fourth coupon adjustment value; and
initiating sending the coupon comprising the final coupon value to an email address associated with the mobile device.

2. The system of claim 1, wherein the operations further comprise:
determining respective probabilities that the location is within the defined region based on the respective error estimates.

3. The system of claim 2, wherein the operations further comprise:
selecting the probability from the respective probabilities based on the indication of the type of location detection system.

4. The system of claim 2, wherein the determining the respective probabilities that the location is within the defined region comprises:
determining the respective probabilities that the location is within the defined region for a group of locations near the defined region.

5. The system of claim 1, wherein the determining the probability comprises:
determining a second region defined by the location and the error estimate;
determining a first size of an intersection area where the second region and the defined region overlap; and
dividing the first size of the intersection area by a second size of the second region.

6. The system of claim 1, wherein the value of the coupon is higher when the probability the mobile device is within the defined region is lower.

7. The system of claim 1, wherein no coupon is sent when the probability that the mobile device is within the defined region is above or below respective predetermined probabilities.

8. The system of claim 1, wherein the operations further comprise:
determining the value of the coupon based on profile information associated with the mobile device.

9. The system of claim 8, wherein the profile information comprises demographic information, information about coupon conversion history, and purchase history.

10. The system of claim 1, wherein the error estimate is based on a type of location determination process.

11. A method, comprising:
determining, by a device comprising a processor, multiple groups of cells in a grid reference system associated with a mobile network that correspond to respective predetermined cells, wherein respective groups of cells of the multiple groups of cells represent possible locations resulting from respective error estimates associated with respective resolutions of respective location detection systems that identify the respective predetermined cells, and wherein the respective error estimates correspond to different error estimates;
adjusting, by the device, a size of a cell from the respective predetermined cells in response to a change in resource data indicative of information for computational resource availability associated with the processor;
receiving, by the device, information representing location information for a mobile device, wherein the location information comprises a cell location in the grid reference system that corresponds to a cell of the respective predetermined cells and an indication of a type of location detection system;
selecting, by the device, a group of cells of the multiple groups of cells based on the type of location detection system;
determining, by the device, a probability that the mobile device is within a geofence region associated with the mobile network based on determining an overlap area of the group of cells and a defined region;

determining, by the device, a base value of a coupon, wherein the base value of the coupon is based the probability that the mobile device is within the defined region;

determining. by the device, a first coupon adjustment value, wherein the first coupon adjustment value is based on profile information comprising demographic information, information about conversation history, and purchase history;

determining, by the device, a second coupon adjustment value, wherein the second coupon adjustment value is based on preference information associated with the profile information, received from a retailer or service provider associated with the defined region;

determining, by the device, a third coupon adjustment value, wherein the third coupon adjustment value is based on a direction of movement of the mobile device;

determining, by the device, a fourth coupon adjustment value, wherein the fourth coupon adjustment value is based on a conversion rate of a user associated with the mobile device;

determining, by the device, a final coupon value based on a combination of the base value of the coupon, the first coupon adjustment value, the second coupon adjustment value, the third coupon adjustment value, and the fourth coupon adjustment value; and transmitting, by the device, the coupon comprising the final coupon value to an email address associated with the mobile device.

12. The method of claim 11, further comprising:
determining sets of probabilities for cells within a predetermined distance from the geofence region.

13. The method of claim 11, wherein the determining that the probability that the mobile device is within the geofence region further comprises:
determining a second region defined by the location and the location resolution;
determining a first size of an intersection area where the geofence region and the second region overlap; and
dividing the first size of the intersection area by a second size of the second region.

14. The method of claim 11, further comprising:
generating, by the device, the coupon offer with the value that is inversely proportional to the probability the mobile device is within the geofence region.

15. The method of claim 11, further comprising:
cancelling, by the device, the coupon offer when the probability that the mobile device is within the geofence region transitions a threshold probability.

16. The method of claim 11, further comprising:
determining, by the device, the value of the coupon offer based on profile information associated with the mobile device.

17. The method of claim 16, wherein the profile information comprises demographic information, information about coupon conversion history, and a purchase history.

18. A non-transitory machine-readable storage medium, comprising executable instructions that, when executed by a processor, facilitate performance of operations, comprising:
computing multiple groups of cells in a grid reference system associated with a communication network that correspond to respective specified cells, wherein a group of cells of the multiple groups of cells represents a possible location due to an error estimate associated with a resolution of a location detection system that identifies the specified cell, wherein respective groups of cells of the multiple groups of cells correspond to respective error estimates associated with respective location detection systems, wherein a size of a cell from the respective groups of cells is determined based on resource data indicative of information for computational resources associated with the processor, and wherein the size of the cell is modified in response to a change in the computational resources;

receiving information representing location information for a mobile device, wherein the location information comprises a cell location in the grid reference system that corresponds to and an indication of a type of location detection system;

selecting a group of cells of the multiple groups of cells based on the type of location detection system and the cell location;

determining a probability that the mobile device is within a defined region associated with a communication network as a function of an overlap area of the group of cells and the defined region;

determining a base value of a coupon, wherein the base value of the coupon is based the probability that the mobile device is within the defined region;

determining a first coupon adjustment value, wherein the first coupon adjustment value is based on profile information comprising demographic information, information about conversation history, and purchase history;

determining a second coupon adjustment value, wherein the second coupon adjustment value is based on preference information associated with the profile information, received from a retailer or service provider associated with the defined region;

determining a third coupon adjustment value, wherein the third coupon adjustment value is based on a direction of movement of the mobile device;

determining a fourth coupon adjustment value, wherein the fourth coupon adjustment value is based on a conversion rate of a user associated with the mobile device;

determining a final coupon value based on a combination of the base value of the coupon, the first coupon adjustment value, the second coupon adjustment value, the third coupon adjustment value, and the fourth coupon adjustment value; and transmitting the coupon comprising the final coupon value to an email address associated with the mobile device.

19. The non-transitory machine-readable storage medium of claim 18, wherein the operations further comprise:
adjusting the value of the coupon based on profile information associated with the mobile device.

20. The non-transitory machine-readable storage medium of claim 19, wherein the profile information comprises demographic information, information about coupon conversion history, and a purchase history.

* * * * *